United States Patent
Belilty

(10) Patent No.: US 11,220,807 B2
(45) Date of Patent: Jan. 11, 2022

(54) SYSTEM FOR ACCUMULATING RAIN WATER

(71) Applicant: HILICO OFF GRID SOLUTIONS LTD., Ramat Gan (IL)

(72) Inventor: Moshe Belilty, Ramat-gan (IL)

(73) Assignee: HILICO OFF GRID SOLUTIONS LTD., Ramat Gan (IL)

( * ) Notice: Subject to any disclaimer, the term of this patent is extended or adjusted under 35 U.S.C. 154(b) by 0 days.

(21) Appl. No.: 16/769,262

(22) PCT Filed: Jan. 28, 2019

(86) PCT No.: PCT/IL2019/050108
§ 371 (c)(1),
(2) Date: Jun. 3, 2020

(87) PCT Pub. No.: WO2019/145959
PCT Pub. Date: Aug. 1, 2019

(65) Prior Publication Data
US 2021/0189700 A1    Jun. 24, 2021

Related U.S. Application Data

(60) Provisional application No. 62/622,904, filed on Jan. 28, 2018.

(51) Int. Cl.
*E03B 3/02* (2006.01)
*C02F 1/00* (2006.01)
*C02F 103/00* (2006.01)

(52) U.S. Cl.
CPC ................ *E03B 3/02* (2013.01); *C02F 1/002* (2013.01); *C02F 2103/001* (2013.01)

(58) Field of Classification Search
CPC ........ E03B 3/02; E03B 3/03; E03B 2001/047; Y02A 20/108; C02F 1/002; C02F 2103/001
See application file for complete search history.

(56) References Cited

U.S. PATENT DOCUMENTS 5,133,167 A * 7/1992 Drew .................... E04B 9/0478
52/506.08
5,299,591 A * 4/1994 Duncan .................... E04B 9/02
137/15.11

(Continued)

FOREIGN PATENT DOCUMENTS

CN    103397680    11/2013
CN    204001492 U    12/2014

(Continued)

OTHER PUBLICATIONS

English Machine Translation of the claims of DE 102009054368 A1 downloaded from the European patent office website. (Year: 2011).*

(Continued)

*Primary Examiner* — Terry K Cecil
(74) *Attorney, Agent, or Firm* — Pearl Cohen Zedek Latzer Baratz LLP

(57) ABSTRACT

It is disclosed a system for accumulating rain water. The system may include: a water-proof foldable collector; a suspension unit; and at least one water accumulator. The suspension unit may be configured to be attached to one anchoring object at at least two attachment locations, wherein when the system is deployed, one of the at least two attachment locations is higher from ground than the at least another attachment location and suspend the collector at a position so as to collect rain water.

10 Claims, 2 Drawing Sheets

(56) References Cited

U.S. PATENT DOCUMENTS

| | | | | |
|---|---|---|---|---|
| 8,178,484 B2* | 5/2012 | Schwarz | ............... | C11D 3/162 |
| | | | | 510/384 |
| 8,925,575 B1* | 1/2015 | Taborek | .................... | E03B 3/03 |
| | | | | 137/357 |
| 9,279,237 B2* | 3/2016 | Catt Lyon | ................. | E03B 3/03 |
| 9,714,521 B1* | 7/2017 | Aloumanis | ............. | E04H 15/54 |
| 10,190,292 B1* | 1/2019 | Shackelford | .............. | E03B 3/03 |
| 2007/0289667 A1* | 12/2007 | Hennessy | ................ | E03B 3/28 |
| | | | | 141/312 |
| 2014/0352842 A1* | 12/2014 | McEvilly | ............... | E04H 15/04 |
| | | | | 141/69 |

FOREIGN PATENT DOCUMENTS

| | | | |
|---|---|---|---|
| CN | 104612208 | | 5/2015 |
| CN | 204675949 U | | 9/2015 |
| CN | 205822341 U | | 12/2016 |
| CN | 206646577 U | | 11/2017 |
| CN | 107476378 A | | 12/2017 |
| CN | 107620344 | | 1/2018 |
| DE | 202005018918 | | 3/2006 |
| DE | 102009054368 A1 * | 5/2011 | ............... E03B 3/02 |
| TW | M445600 U | | 1/2013 |

OTHER PUBLICATIONS

English Machine Translation of the description of DE 102009054368 A1 downloaded from the European patent office website. (Year: 2011).*

International Search Report of Application No. PCT/IL2019/050108 dated Apr. 3, 2019.

Office Action for corresponding Chinese Application No. 2019800103066, dated Aug. 4, 2021.

* cited by examiner

SYSTEM FOR ACCUMULATING RAIN WATER

CROSS-REFERENCE TO RELATED APPLICATIONS

This application is a National Phase Application of PCT International Application No. PCT/IL2019/050108, International Filing Date Jan. 28, 2019, claiming the benefit of U.S. patent application Ser. No. 62/622,904, filed Jan. 28, 2018, which are hereby incorporated by reference.

TECHNICAL FIELD OF THE INVENTION

The invention generally relates to systems of accumulating rain water and more particularly to portable systems for accumulating and filtering rain water.

BACKGROUND OF THE INVENTION

In many inhabited places on earth drinking water of good quality is hard to find, even in tropical climate areas. For example, overpopulated third world cities, and disaster-stricken areas may lack clean drinking water, and tap water may be in shortage or may be polluted. In another example, a traveler walking through a rain forest may not find water except for water bodies such as rivers or lakes and may have no way to determine whether the water in these bodies of water is suitable for drinking. In such conditions, accumulating rain water may be a useful solution for providing drinking water of sufficient quality.

Accordingly, a light weight and foldable system for accumulating rain water may allow providing drinking water of good quality in such conditions.

SUMMARY OF THE INVENTION

Some aspects of the invention may be related to a system for accumulating rain water. The system may include: a water-proof foldable collector; a suspension unit; and at least one water accumulator. In some embodiments, the suspension unit may be configured to be attached to one anchoring object at at least two attachment locations, and when the system is deployed, one of the at least two attachment locations is higher from ground than the at least another attachment location, and suspend the collector at a position so as to collect rain water.

In some embodiments, the collector may be configured to funnel the collected rain water towards an outlet therein, and the outlet may be in fluid connection to the at least one water accumulator, to accumulate the collected rain water. In some embodiments, the suspension unit may include at least two rods, configured to be attached along respective two sides of the collector. In some embodiments, each rod from the at least two rods may be a foldable rod. In some embodiments, each rod from the at least two rods may be assembled from a plurality of sub-rods. In some embodiments, the suspension unit may further include at least one outlet stabilizing element. In some embodiments, the least one outlet stabilizing element may be one of: a stabilizing rod and a weight.

In some embodiments, the suspension unit may further include elements for releasably attaching the suspension unit to the at least one anchoring object, such elements may include at least one of: a strap, a string, a rope, a hook and a carabiner. In some embodiments, the rods may be attached at a first end to the anchoring object at the lower attachment location, and at a second end through at least one string to the anchoring object at the upper attachment location. In some embodiments, the length of the at least one string may be configurable, so as to change the inclination of the rods and the inclination of the collector.

In some embodiments, the system may include at least a first water accumulator and a second water accumulator, and at least the first water accumulator may include an inlet and an outlet. In some embodiments, the inlet of the first water accumulator may be connected to the outlet of the collector via a first pipe, and the inlet of the at least one second water accumulator may be connected to the outlet of the first accumulator via a second pipe, so as to concatenate the water accumulation of water between the at least two water accumulators. In some embodiments, the location of the outlet of the first accumulator may be determined to ensure that water may reach the inlet of the at least one second water accumulator only after the at least one first water accumulator is filled with water.

In some embodiments, the system may further include at least one filter, configured to filter the water the at least one filter is located at or between the outlet of the collector and the entrance to the water accumulator. In some embodiments, the at least one filter may include at least a first filter and a second filter, and the first filter is configured to filter objects of a first size from the water, and the second filter is configured to filter objects of a second size from the water, and wherein the first size is larger than the second size.

In some embodiments, the water-proof foldable collector may include at least one of: a water-proof fabric, a polymeric sheet and a foldable polymeric structure. In some embodiments, at least a portion of the water-proof foldable collector may be coated with an antibacterial coating.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
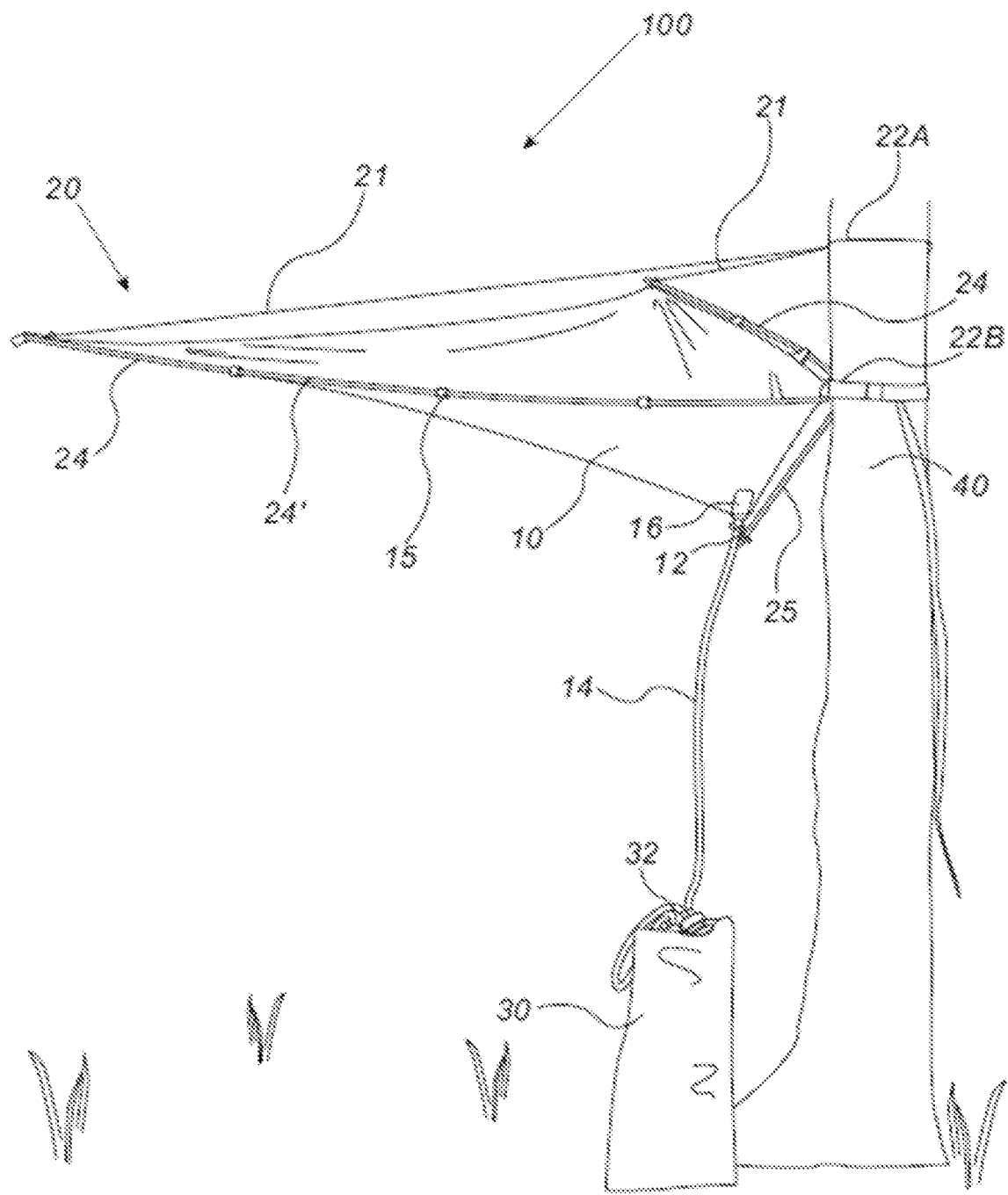
FIGS. 1A and 1B are illustrations of systems for accumulating rain water according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of embodiments of the invention. However, it will be understood by those skilled in the art that the present invention may be practiced without these specific details. In other instances, well-known methods, procedures, and components have not been described in detail so as not to obscure the present invention.

A system for accumulating rain water according to some embodiments of the invention may be simple to operate, foldable, portable, light, and cheap. It may be configured to be attached to a variety of anchoring objects, such as trees, pillars, walls etc. In some embodiments, the system may be attached to a single anchoring object, for example: a single three or pillar.

As used herein the term "portable system" may refer to any system that is light and compact (e.g., fold able) enough to be easily hand carried or carried over the shoulder by a user (e.g., a human) from one place to the other. In some embodiments, such a portable system may be designed to be carried in a bag and may be light enough to be carried for several hours (e.g., at least 3 hours).

Figure 1B:
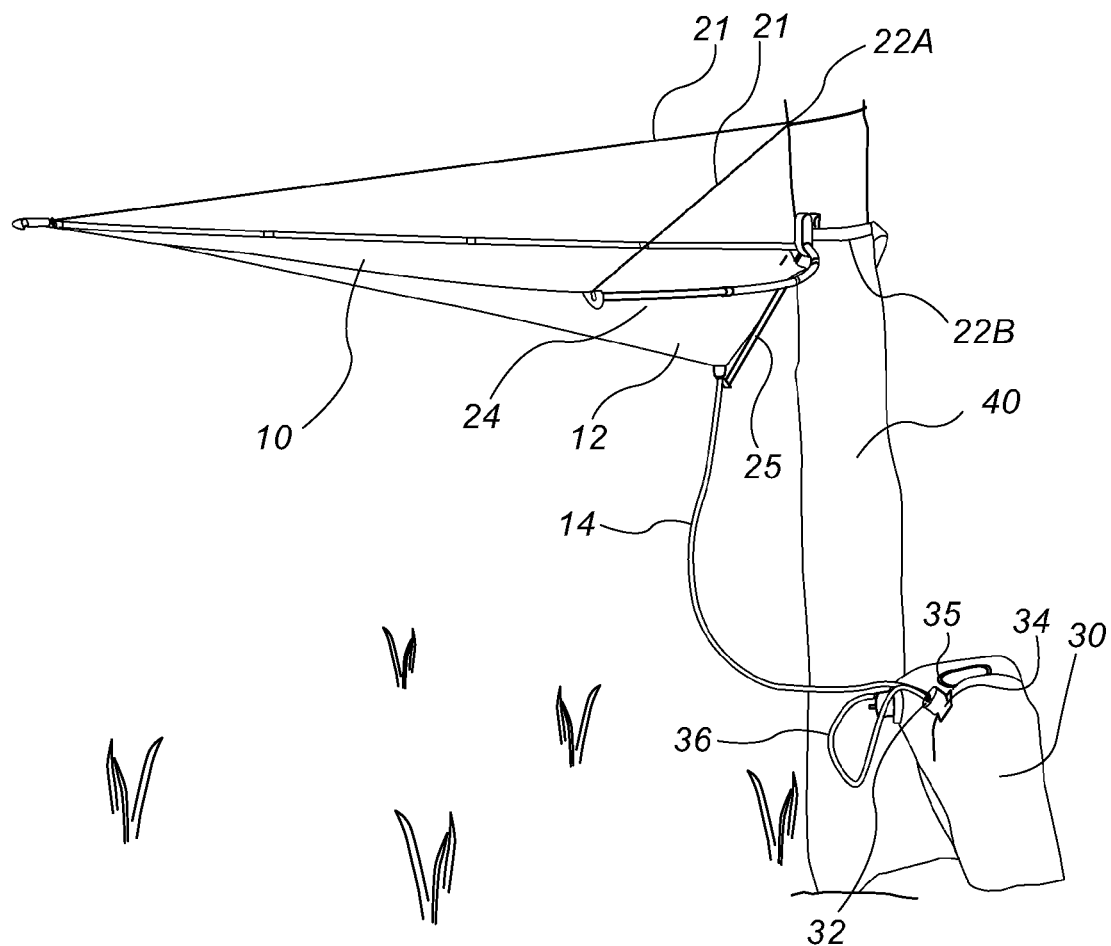

Reference is now made to FIGS. 1A and 1B, which are illustrations of systems for accumulating rain water according to some embodiments of the invention. A system 100 may include: a collector 10, a suspension unit 20 and at least one water accumulator 30.

In some embodiments, collector 10 may be foldable and waterproof. Collector 10 may be made from or may include a foldable element such as: a water-proof fabric, a polymeric sheet, a foldable polymeric structure, and a silicone coated polyester fabric. In some embodiments, at least a portion of the water-proof foldable collector 10 may be coated with an antibacterial coating.

In some embodiments, collector 10 may further include therein an outlet 12 which may be in fluid connection to at least one water accumulator 30. Collector 10 may be configured to funnel the collected rain water towards outlet 12. In some embodiments, collector 10 may, when deployed, be configured to collect 1 liter of water for every 1 mm of rain. It should be appreciated that other sizes of collector In some embodiments, collector 10 may further include attachment elements 15 for attaching collector 10 to components of suspension unit 20. In some embodiments, collector 10 may be configured to be detachable from other elements of system 100, for cleaning and folding of collector 10. After cleaning, collector 10 may be reassembled to system 100.

In some embodiments, suspension unit 20 may be configured to be attached to at least one anchoring object 40 at two attachment locations: an first attachment location 22A and a second attachment location 22B and suspend collector 10 so as to collect rain water. In some embodiments, first attachment location 22A and second attachment location 22B may be substantially vertical to each other. In some embodiments, when the system may be deployed, first attachment location 22A is higher from ground than second attachment location 22B. For example, suspension unit 20 may suspend collector 10 at a substantially horizontal position or at a slightly inclined position (e.g., between 5 and 30 degrees above the horizon). In some embodiments, suspension unit 20 may be configured to be attached to a variety of different anchoring objects 40, for example: a tree, a pillar, a wall, a bush and the like. In some embodiments, first attachment location 22A may be attached to a branch of a tree and second attachment location 22B may be attached to the trunk of the three.

In some embodiments, suspension unit 20 may include two rods 24 configured to be attached along two respective sides of water collector 10 by using, for example, attachment elements 15. In some embodiments, rods 24 may be foldable rods made from, metals (e g , aluminum), polymers, composite materials (e.g., carbon fiber reinforced polymer), wood (e.g., bamboo) and any combination thereof. In some embodiments, rods 24 may be assembled from a plurality of short-rods 24'. In some embodiments, rods 24 may have a telescopic structure configured to extend upon opening and collapse back in closure.

In some embodiments, suspension unit 20 may further include elements for releasably attaching unit 20 to anchoring object 40, the elements may include at least one of: a strap, a string, a rope, a hook, a carabiner, a band clamp, a rubber band, and the like. In some embodiments, rods 24 may be attached at a first end to anchoring object 40 at a second attachment location 22B, and at a second end through at least one string 21 to anchoring object 40 at an first attachment location 22A. In some embodiments, the length of at least one string 21 is configurable, so as to change the inclination of rods 24 and the inclination of collector 10.

In some embodiments, suspension unit 20 may further include at least one outlet stabilizing element 25 for stabilizing outlet 12 at the lowest position in collector 10, when collector 10 is assembled and anchored to object 40. In some embodiments, the least one outlet stabilizing element 25 may be one of: a stabilizing rod (as illustrated), a weight connected to outlet 12, and the like.

In some embodiments, system 100 may further include at least one filter 16 configured to filter the water. In some embodiments, filter 16 may be located at or between outlet 12 of collector 10 and an inlet 32 of water accumulator 30. In some embodiments, filter 16 may be any element that is configured to remove impurities and contaminations of water, using for example: a fine physical barrier, a chemical process or a biological process. Filter 16 may include, for example: granular-activated carbon filter, metallic alloy filters, microporous-ceramic filters, carbon-block resin, microfiltration and ultrafiltration membranes, filtering fabrics, and the like.

In some embodiments, filter 16 may include at least a first filter and a second filter, and the first filter may be configured to filter objects of a first size (e.g., 180 µm) from the water, and the second filter may be configured to filter objects of a second size (e.g., 38 µm) from the water, such that the first size is larger than the second size. In some embodiments, the first filter may be a physical barrier and the second filter may be a chemical or biological process purification filter.

In some embodiments, at least one water accumulator 30 may include an inlet 32 and an outlet 34. In some embodiments, water collector 10 may provide the collected water to water accumulator 30 via a first pipe 14, connecting outlet 12 of collector 10 and inlet 32 of water accumulator 30. In some embodiments, water accumulator 30 may be made of any suitable material, for example a polymer, and may be designed to accumulate any volume of water, for example: 1 liter, 2 liters, 1 gallon and the like. In some embodiments, when empty of water, accumulator 30 may be foldable.

System 100 may include two or more accumulators 30. For example, system 100 may include water accumulator 30 and at least another water accumulator 35. In some embodiments, the inlet of at least another water accumulator 35 may be connected to outlet 34 of accumulator 30 via a second pipe 36, so as to concatenate the water accumulation of water between the two or more water accumulators 30 and 35. In some embodiments, the location of the outlet of the first accumulator may be determined to ensure that water may reach inlet of the at least one second water accumulator 35 only after the at least one first water accumulator 30 may be filled with water.

In some embodiments, system 100 may be foldable to be inserted to a portable bag. In some embodiments, the total weight of system 100 may be less than 1 kg, for example, 800 gr. All the components of system 100 listed herein, may be configured to be inserted to the bag. In some embodiments, system 100 may be disassembled and reassembled within minutes.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A portable system for accumulating rainwater, which is configured to be attached to an external anchoring object in an environment in which the portable system is deployed, the portable system comprising:
    a water-proof foldable collector configured to collect the rainwater and including, upon deployment a funnel area to deliver the collected rainwater towards an outlet of the collector;
    a suspension unit configured to suspend the water-proof foldable collector at a rainwater-collection position, the suspension unit configured to anchor the water-proof foldable collector to the external anchoring object in the environment in which the portable system is deployed at at least two attachment locations at different heights on the external anchoring object; and
    at least one foldable water accumulator in fluid communication with the water-proof foldable collector, and configured to collect the rainwater drained by the water-proof foldable collector, wherein the outlet of the collector is in fluid connection to the at least one foldable water accumulator, to accumulate the collected rainwater,
    wherein the suspension unit comprises at least two foldable and/or telescopic rods atop the funnel area upon deployment, each rod configured to be attached along a respective side of the collector,
    wherein the suspension unit further comprises at least one stabilizing rod extending downwardly to the outlet and/or comprising at least one weight connected to the outlet of the collector to stabilize the outlet at a lowermost point of the collector in the rainwater-collection position,
    wherein the suspension unit further comprises elements spaced from one another for releasably attaching the suspension unit respectively to the at least two attachment locations at different heights on the external anchoring object in the environment upon deployment, said elements including at least one of: a strap, a string, a rope, a hook and a carabiner, and
    wherein the portable system is foldable for insertion into a carrying bag, without the external anchoring object.

2. The system of claim 1, wherein each rod from the at least two rods is assembled from a plurality of sub-rods.

3. The system of claim 1, wherein the rods are attached at a first end to the anchoring object at a first attachment location, and at a second end through at least one string to the external anchoring object at a second attachment location, wherein said second attachment location is located higher from ground than the first attachment location.

4. The system of claim 3, wherein the length of the at least one string is configurable, so as to change the inclination of the rods and the inclination of the collector.

5. The system of claim 1, further comprising a first water accumulator and a second water accumulator, wherein:
    the first water accumulator comprises an inlet and an outlet and the second water accumulator comprises at least an inlet,
    the inlet of the first water accumulator is connectable to the outlet of the foldable collector via a first pipe, and
    the inlet of the second water accumulator is connectable to the outlet of the first accumulator via a second pipe, so as to concatenate accumulation of water between the at least two water accumulators.

6. The system of claim 5, wherein a location of the outlet of the first accumulator is determined to ensure that water reaches the inlet of the second water accumulator only after the at least one first water accumulator is filled with water.

7. The system of claim 5, further comprising at least one filter, configured to filter the water, wherein the at least one filter is located at or between the outlet of the collector and the inlet of the first water accumulator.

8. The system of claim 7, wherein:
    the at least one filter comprises at least a first filter and a second filter,
    the first filter is configured to filter objects of a first size from the water,
    the second filter is configured to filter objects of a second size from the water, and
    the first size is larger than the second size.

9. The system of claim 1, wherein the water-proof foldable collector comprises at least one of: a water-proof fabric, a polymeric sheet and a foldable polymeric structure.

10. The system of claim 1, wherein at least a portion of the water-proof foldable collector is coated with an antibacterial coating.

* * * * *